Jan. 10, 1933.  C. A. ROBBINS  1,893,961
AUXILIARY PACKING GLAND
Filed Aug. 6, 1931
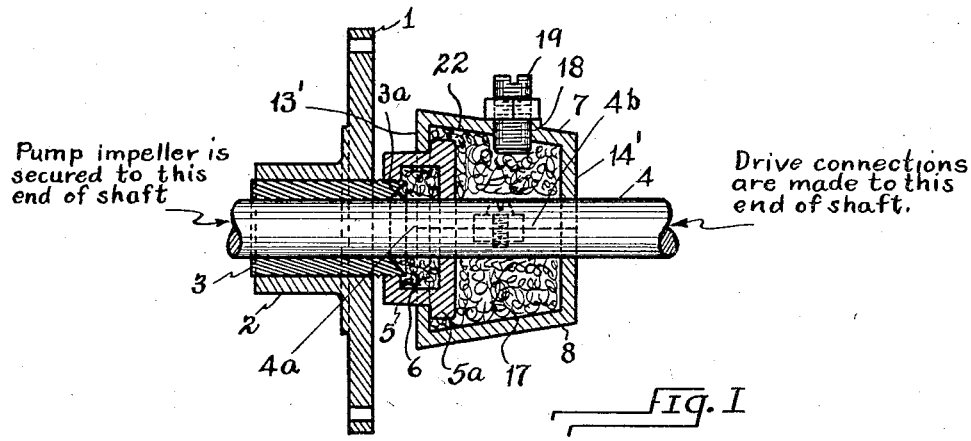
Pump impeller is secured to this end of shaft
Drive connections are made to this end of shaft.
Fig. I
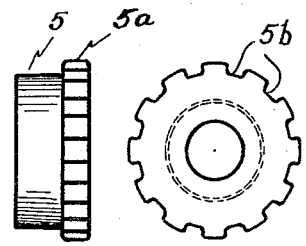
Fig. II
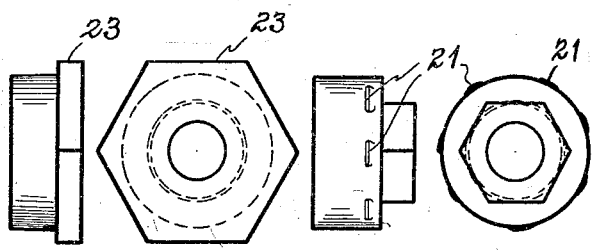
Fig. III
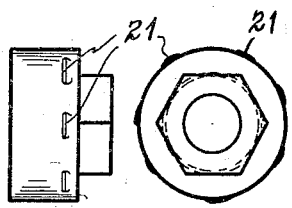
Fig. IV
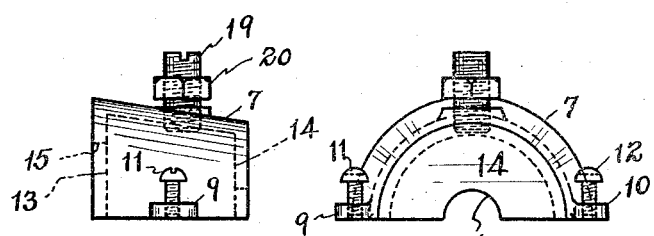
Fig. V  Fig. VI
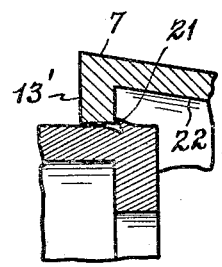
Fig. VII
INVENTOR
Charles A. Robbins
by Christy Christy and Wharton
his attorneys Patented Jan. 10, 1933

1,893,961

UNITED STATES PATENT OFFICE

CHARLES A. ROBBINS, OF PITTSBURGH, PENNSYLVANIA

AUXILIARY PACKING GLAND

Application filed August 6, 1931. Serial No. 555,499.

The invention relates to a rotary pump, particularly a pump for circulating the cooling water of an automobile engine. More specifically the invention is directed to an auxiliary packing gland for a rotary pump—a device especially designed for the repair of a leaking automobile water-pump.

It is a matter of common knowledge that an automobile, which has a jacket of cooling water about its engine, is provided with a rotary pump to effect circulation of such water. Ordinarily, the pump comprises a housing in which a shaft is revolubly mounted; an impeller is secured to such shaft within the housing, and the shaft extends through one side wall of such housing; driving connections are made from the extending end of the shaft to a convenient source of motion in the engine. Accordingly, when the engine runs the shaft is rotated; the impeller is revolved within its housing, and, by means of appropriately disposed conduits, extending from the pump to the water jacket of the engine, circulation of the cooling water is effected. The water pumps of most standard makes of cars are so constructed that their impeller shafts extend through only one of the opposed end walls of the pump housing. Where the shafts pass through such walls, packing must be provided to prevent leakage of water, so it will be understood that if a shaft extends through only one wall of the pump housing (the opposite wall thereof being blind) only one packing will be necessary. Of course, if the shaft of a pump extends through both end walls of the housing, the device of my invention may be utilized adjacent both of such walls, but a description of an installation adjacent one wall of the pump housing will afford a clear understanding of the invention.

As mentioned, a rotary water pump, as it is first installed in an automobile, is provided with a packing gland at the point where the impeller shaft extends through the wall of the pump housing. This packing comprises a bushing rigidly secured in the wall of the pump housing, and the impeller shaft of the pump extends with running fit through this bushing. Outwardly of the housing wall a packing gland is associated (in threaded engagement) with the bushing. The packing gland is so formed as to provide an interior chamber which, when the gland is fitted over the impeller shaft and secured on the above-mentioned bushing, provides a closed chamber for packing material. Packing material is placed in such chamber, before assembling the gland on the bushing, and, when the parts are assembled and the gland is screwed tightly on the bushing, the packing material is compressed around the shaft, forming a water-tight bearing on the shaft, and preventing leakage of water from the pump. The specific composition of the packing material is not a matter of initial concern herein, there being several well-known commercial compositions which may be employed.

As in service the packing material wears away and the pump becomes leaky, invariably such is the case, the packing gland is turned-up on the bushing, further compressing the packing material, and again insuring a water-tight pump. After several of such adjustments, however, the gland can be no further adjusted—it becomes lodged at the end of its travel on the packing bushing, and the only procedure which may then be followed is to remove the packing gland and to renew the packing material. Here arise the difficulties which I seek to overcome.

In most makes of motor cars it is practically necessary to dismantle the water pump from its support, to permit the repacking of the gland. The dismantling of the pump involves a great loss of time and of labor, and is costly to the car owner. Additionally, it has been found that, when a motor car has been operated, say for a distance of fifteen or twenty thousand miles, the impeller shaft is severely galled or worn where the packing material has been compressed against it. The latter condition proves that (even when the packing gland is removed and the packing material renewed) a satisfactory repair cannot be made; the irregular, galled surface of the shaft prevents the new packing from giving a tight joint, and also abrades and in general destroys the durability of packing material.

The object of my invention is to provide an auxiliary packing gland which is adapted to be installed without dismantling an automobile water-pump (or the like) from its support.

A further object of my invention is to provide an auxiliary packing gland which may be associated with a primary or main packing gland to insure a fluid-tight condition around a revolving shaft. Other objects will present themselves in the following specification.

An embodiment of the invention is illustrated in the accompanying drawing, in which Fig. I is a view in vertical section, illustrating an impeller shaft extending through the end wall of a pump housing, and showing the auxiliary packing gland of my invention in position of service; Figs. II, III, and IV are each views in side and end elevations of three of the different forms of packing glands to be found on standard makes of automobile water-pumps; Fig. V is a view in side elevation of the auxiliary packing gland of my invention, the two parts thereof being separated from each other; Fig. VI is a view of the separated members of my packing gland in end elevation; and Fig. VII is a fragmentary view, showing to larger scale the packing gland illustrated in Fig. IV, and indicating how such packing gland may advantageously be prepared for the installation of the auxiliary gland.

In Fig. I the reference numeral 1 is applied to the end wall of a pump housing; such end wall in this case is shown to be provided with a cylindrical boss 2, within which a packing bushing 3 is rigidly secured, conveniently by a "drive" fit. The impeller shaft 4 of the pump is journaled in bushing 3; the outer (right-hand) end of the bushing is threaded and a packing gland 5 is secured in threaded engagement thereon. According to common practice the bushing 3 is provided with an inclining face 3a, and the gland 5 is recessed to form a chamber for a wad of packing material 6. Manifestly, when the gland 5 is turned-up on the bushing 3, the packing material is tightly compressed around the shaft 4, affording a fluid-tight joint. From time to time the packing material 6 (due to wear) must be further compressed, and this is accomplished by screwing the gland 5 further upon the bushing 3.

After several of such adjustments, the gland 5 will reach the end of the travel permissive on bushing 3, and, according to the practice hitherto, a renewal of the packing material 6 will be required if a fluid-tight joint is to be maintained. I have described, however, the disadvantages accompanying the renewal of such packing, i. e., the pump must be dismantled and the gland 5 removed from the bushing 3, and even when this is done the new packing material inserted, the repair is unsatisfactory, because the shaft 4 has in service become roughened and galled in the region 4a, thus preventing a perfect packing.

In utilizing my auxiliary packing gland, I do not dismantle the pump, I leave the gland 5 in place, and adapt a new region 4b on the shaft 4, upon which to compress packing material. In brief, I provide an auxiliary gland which fits both the main gland 5 and the shaft 4, so as to provide a secondary chamber, outwardly of the main gland 5, for the housing of packing material.

The auxiliary gland comprises a plurality of segments—in this case I show two segments 7 and 8—each of which segments is provided with laterally extending lugs 9—10. The lugs are matched and drilled and threaded, so that screws 11 and 12 will serve, as indicated, mutually to secure the segments in annular arrangement around the shaft 4. It will be manifest that the segments 7 and 8 may be easily positioned over the shaft and secured in the position indicated in Fig. 1.

It will be perceived that each segment (7, 8) is provided with end webs 13 and 14; the webs are recessed at 15 and 16, so that when the segments are assembled on shaft 4 (cf. Fig. I) a chambered body is formed, having two orificed, transversely extending, end walls 13' and 14'. The wall 13' peripherally fits the main gland 5, while the wall 14' peripherally fits the shaft 4. A mass or wad of packing material 17 is placed within the chamber formed by members 7 and 8; conveniently the packing material is placed in the segments before they are secured on the shaft 4. One of the segments is provided with an orifice 18, and a plug 19 is screw-threaded and axially adjustable in the orifice. The screw plug 19 is removable, whereby access is had to introduce packing material, as needed, to the chamber of auxiliary gland 7, 8. When sufficient packing material is inserted, the screw plug is turned in toward the shaft, thereby compressing the packing material to form a fluid-tight joint. A lock-nut 20 serves to secure the screw plug in adjusted position.

The auxiliary packing gland may be adapted to fit any of the conventional types of main packing glands now employed. Some glands are formed (as the gland 5 is shown) with a shoulder 5a; notches 5b are provided in the shoulder to permit convenient use of a gland-turning tool. Other glands have shoulders 23 in the form of a nut (see Fig. III) to permit a wrench to be employed in adjusting them. In either case the auxiliary gland 7, 8 is so positioned that its end wall 13' abuts the shoulder portion of the gland. Indeed, if the main packing gland of the pump is without a shoulder, such as the gland shown in Fig. IV, I upset ridges 21 on its surface. A cold chisel is a convenient tool to be used for this purpose, and the manner in which the end wall 13' of the auxiliary gland 7, 8 abuts these ridges is indicated to larger scale in Fig. VII. Advantageously, the interior wall 22 of the chamber within the auxiliary gland (7, 8) is tapering in the direction shown. Accordingly, when the screw plug 19 is turned-in to compress the packing material, reaction forces are created, and these forces, manifestly, are resultant in forcing the end wall 13' of the auxiliary gland tight against the shoulder (5a) of the main packing gland.

So it will be perceived that advantages of the nature indicated are obtained through the utility of a device which is easy to install, inexpensive to manufacture, and certain in operation. While I have said that the auxiliary gland is particularly adapted for automobile water-pumps, I contemplate its use in the pumps found in airplanes, railway engines, ships, and in other machines where packings are subject to failure or require reinforcement and repair. In fact, my auxiliary packing gland will find use in packing a shaft or tube projecting from the wall of any chamber in which liquids or gases are confined.

I claim as my invention:

1. For combination with a main packing gland upon a shaft, an auxiliary packing gland comprising two segments each including an end wall portion which in assembly bears edgewise upon the lateral face of said main packing gland, and means for drawing said segments together and securing said wall portions edgewise and peripherally upon said main packing gland.

2. For combination with a main packing gland upon a shaft, an auxiliary packing gland including two segments each including a side wall and opposite end wall portions, the two segments in assembly upon said shaft providing an auxiliary chamber for packing material, the end wall portions at one end of the assembled segments being adapted to bear edgewise and peripherally upon the lateral face of said main packing gland, and the end wall portions at the opposite end of the assembled segments being adapted to bear edgewise upon the shaft, and means for drawing said segments together and securing the end wall portions, first described in assembly, edgewise upon said main gland, together with an adjustable compressing screw projecting through the side wall of one segment and in threaded engagement therewith.

3. The structure of the next preceding claim, in which the side walls of said segments incline from end to end, whereby in assembly the compression of packing material in the auxiliary chamber formed by the segments tends to shift the assembly axially of the shaft upon which it is installed.

In testimony whereof I have hereunto set my hand.

CHARLES A. ROBBINS.